(12) United States Patent
Shaw et al.

(10) Patent No.: US 11,222,303 B2
(45) Date of Patent: Jan. 11, 2022

(54) SYSTEMS AND METHODS FOR SECURE PACKAGE DELIVERY

(71) Applicant: AT&T Intellectual Property I, L.P., Atlanta, GA (US)

(72) Inventors: Venson Shaw, Kirkland, WA (US); Sangar Dowlatkhah, Alpharetta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 595 days.

(21) Appl. No.: 15/474,703

(22) Filed: Mar. 30, 2017

(65) Prior Publication Data

US 2018/0285811 A1  Oct. 4, 2018

(51) Int. Cl.
*G06Q 10/08*  (2012.01)

(52) U.S. Cl.
CPC ................. *G06Q 10/0833* (2013.01)

(58) Field of Classification Search
CPC .................................. G06Q 10/08; G06T 7/00
USPC .................................................. 705/28, 340
See application file for complete search history.

(56) References Cited

U.S. PATENT DOCUMENTS

| 7,489,246 | B2 | 2/2009 | Himberger et al. |
| 7,492,267 | B2 | 2/2009 | Bilyeu et al. |
| 7,683,773 | B1 | 3/2010 | Goodall et al. |
| 7,825,803 | B2 | 11/2010 | Neff et al. |
| 8,077,040 | B2 | 12/2011 | Muirhead |
| 8,140,062 | B1 * | 3/2012 | Hildner ............... H04W 12/12 455/418 |
| 8,140,397 | B2 | 3/2012 | Robinson et al. |
| 8,169,303 | B2 * | 5/2012 | Hanebeck .......... G08B 13/2402 340/10.51 |
| 8,219,466 | B2 | 7/2012 | Gui et al. |
| 8,373,538 | B1 * | 2/2013 | Hildner ............. H04W 12/0013 340/3.1 |
| 9,443,276 | B2 | 9/2016 | Barry, III |
| 9,456,339 | B1 * | 9/2016 | Hildner .................. H04W 4/50 |
| 9,510,316 | B2 * | 11/2016 | Skaaksrud .......... H04L 41/0813 |

(Continued)

FOREIGN PATENT DOCUMENTS

| CN | 201974524 U | 9/2011 |
| CN | 203094754 U | 7/2013 |

(Continued)

OTHER PUBLICATIONS

Chattopadhyay, Arunabh, "RFID Asset Management Solution with Cloud Computation Service" Dissertation (Year: 2012).*

(Continued)

*Primary Examiner* — Olusegun Goyea
(74) *Attorney, Agent, or Firm* — BakerHostetler

(57) ABSTRACT

A method includes detecting, via an RFID reader of a package repository, an RFID tag associated with a package and, based on detecting the RFID tag, communicating, to a network device, an update for a shipping history. The method includes detecting, by a sensor associated with the package repository, a presence in a vicinity of the package repository. The method also includes detecting that the RFID tag is outside a range of the RFID reader and, responsive to the RFID tag being outside the range of the RFID reader, transmitting at least a portion of sensor data captured subsequent to detecting the presence to the network device.

19 Claims, 9 Drawing Sheets

(56) References Cited

U.S. PATENT DOCUMENTS

| | | | |
|---|---|---|---|
| 9,820,144 B1* | 11/2017 | Hildner | H04W 12/0013 |
| 9,877,210 B1* | 1/2018 | Hildner | H04L 63/30 |
| 9,948,902 B1* | 4/2018 | Trundle | H04N 7/183 |
| 9,949,228 B2* | 4/2018 | Skaaksrud | B65D 25/02 |
| 9,959,439 B1* | 5/2018 | Lui | G06Q 10/0833 |
| 10,148,918 B1* | 12/2018 | Seiger | G06Q 10/087 |
| 10,149,104 B2* | 12/2018 | Skaaksrud | H04W 76/15 |
| 10,187,748 B2* | 1/2019 | Skaaksrud | H04L 67/12 |
| 2002/0038267 A1 | 3/2002 | Can et al. | |
| 2002/0067267 A1 | 6/2002 | Kirkham | |
| 2006/0168644 A1 | 7/2006 | Richter et al. | |
| 2010/0001846 A1 | 1/2010 | Cardullo | |
| 2010/0127871 A1 | 5/2010 | Pontin | |
| 2011/0244798 A1 | 10/2011 | Daigle et al. | |
| 2014/0073291 A1* | 3/2014 | Hildner | H04L 63/30 |
| | | | 455/411 |
| 2014/0102338 A1 | 4/2014 | Stevens | |
| 2014/0111334 A1 | 4/2014 | Carpenter et al. | |
| 2014/0253297 A1* | 9/2014 | Kawaguchi | G06Q 10/083 |
| | | | 340/10.51 |
| 2015/0153175 A1* | 6/2015 | Skaaksrud | H04W 12/08 |
| | | | 701/23 |
| 2015/0154431 A1* | 6/2015 | Skaaksrud | H04H 20/61 |
| | | | 340/10.1 |
| 2015/0154538 A1* | 6/2015 | Skaaksrud | G05D 1/021 |
| | | | 705/333 |
| 2015/0154544 A1* | 6/2015 | Skaaksrud | G06Q 10/0835 |
| | | | 705/333 |
| 2015/0154551 A1* | 6/2015 | Skaaksrud | G05D 1/0088 |
| | | | 705/333 |
| 2015/0154553 A1* | 6/2015 | Skaaksrud | B65D 25/02 |
| | | | 705/333 |
| 2015/0310715 A1 | 10/2015 | Nekoogar et al. | |
| 2016/0012390 A1* | 1/2016 | Skaaksrud | H04W 76/10 |
| | | | 705/332 |
| 2016/0171434 A1* | 6/2016 | Ladden | G06Q 10/083 |
| | | | 705/332 |
| 2016/0171436 A1* | 6/2016 | Ladden | G06Q 10/083 |
| | | | 705/333 |
| 2016/0171437 A1* | 6/2016 | Ladden | G06Q 10/083 |
| | | | 705/340 |
| 2016/0171438 A1* | 6/2016 | Ladden | G06Q 10/0833 |
| | | | 715/741 |
| 2016/0171439 A1* | 6/2016 | Ladden | G06Q 10/06316 |
| | | | 705/340 |
| 2016/0320773 A1* | 11/2016 | Skaaksrud | H04L 41/0813 |
| 2017/0039630 A1 | 2/2017 | Daigle et al. | |
| 2017/0164319 A1* | 6/2017 | Skaaksrud | G06Q 20/40 |
| 2017/0278061 A1* | 9/2017 | Skaaksrud | H04W 4/029 |
| 2017/0280289 A1* | 9/2017 | Skaaksrud | H04W 4/80 |
| 2017/0280297 A1* | 9/2017 | Skaaksrud | H04W 4/023 |
| 2017/0293885 A1* | 10/2017 | Grady | G08B 21/18 |
| 2017/0311280 A1* | 10/2017 | Skaaksrud | B65D 25/02 |
| 2017/0347333 A1* | 11/2017 | Skaaksrud | G16H 10/60 |
| 2017/0353943 A1* | 12/2017 | Skaaksrud | G01C 21/362 |
| 2018/0197139 A1* | 7/2018 | Hill | G06Q 10/0832 |
| 2018/0200761 A1* | 7/2018 | Putcha | G06Q 50/28 |
| 2018/0249292 A1* | 8/2018 | Skaaksrud | H04W 36/08 |
| 2018/0262724 A1* | 9/2018 | Ross | H04N 7/188 |
| 2019/0174098 A1* | 6/2019 | Smith | G08B 13/19669 |

FOREIGN PATENT DOCUMENTS

| | | |
|---|---|---|
| CN | 103971140 A | 8/2014 |
| CN | 102902992 B | 10/2015 |
| DE | 202010018131 U1 | 4/2014 |

OTHER PUBLICATIONS

Mainetti, Luca "An RFID-Based Tracing and Tracking System for the Fresh Vegetables Supply Chain" International Journal of Antennas and Propagation, Dec. 1, 2013, vol. 2013, p. 1-15 (Year: 2013).*

Ruiz-Garcia et al.; "Monitoring Cold Chain Logistics by Means of RFID"; Sustainable Radio Frequency Identification Solutions; InTech; 2010; p. 37-50.

"Tip and Drop Indicators"; http://www.shippinglabels.com/tip-and-drop-indicators-labels; Shipping Labels; © 2017; accessed May 2, 2017; 2 pages.

"Savi Container Security Tag (ST-675)"; Specification Sheet; Savi Technology; © 2013; 2 pages.

Rhea, Wessel; "Cargo-Tracking System Combines RFID, Sensors, GSM and Satellite"; http://www.rfidjournal.com/articles/view?3870; RFID Journal LLC; © 2002-2017; 2 pages.

Beth, Bacheldor; "TNT Uses RFID to Track Temperatures of Sensitive Goods:"; http://www.rfidjournal.com/articles/view?2726/; RFID Journal LLC; © 2002-2017.

* cited by examiner

SYSTEMS AND METHODS FOR SECURE PACKAGE DELIVERY

TECHNICAL FIELD

This disclosure relates generally to secure package delivery and, more specifically, to using electronic tags to track and control delivery of packages.

BACKGROUND

Tracking packages in transit presents a variety of difficulties. For example, it may be desirable to track the location of a package. As another example, it may be desirable to determine how a package was handled in transit, including whether the package was tampered, dropped, or otherwise mishandled. For example, while traditional packaging may show evidence of water damage, no mechanism is in place that can identify how such damaged was caused, including the identity of the responsible party. As shipping becomes more complex, more parties may be involved in handling or delivering packages before they reach their final destination.

Further, tracking a package after it has been delivered to its target destination presents additional problems. For example, theft of mail and packages dropped at doorstops may be resolved by expanding tracking capabilities.

SUMMARY

The methods and systems disclosed herein may be used to track packages and to monitor packages once they arrive at a particular destination, like a package repository, which may include a mail box, a drop off location, or any other designated location. For example, the packages may include electronic identifiers, such as radio frequency identification (RFID) tags, that may be detected by sensor-enabled devices, to confirm the presence of the package at the location of the sensor-enabled device. Further, other sensors, like cameras, may capture data that may record the status of a package, such as it being picked up or mishandled. Optionally, a locking mechanism may engage to prevent the package from being removed from a package repository without the proper electronic key.

In an aspect, this disclosure may be directed to a system comprising an input/output for communicating with a network and a processor communicatively coupled to the input/output. The system may also include a package repository having an RFID reader communicatively coupled to the processor. The system may also include memory storing instructions that cause the processor to effectuate operations. The operations may include detecting, via the RFID reader, an RFID tag associated with a package. The operations may include, based on detecting the RFID tag, updating a shipping history of the package stored on the network with a location of the package repository. The operations may include detecting, by the sensor, a presence in a vicinity of the package repository and causing the sensor to record sensor data in response to detecting the presence. The operations may include detecting that the RFID tag is outside a range of the RFID reader and, responsive to the RFID tag being outside the range of the RFID reader, transmitting at least a portion of the sensor data to the network.

According to another aspect, this disclosure may be directed to a method. The method may include detecting, via a RFID reader of a package repository, an RFID tag associated with a package. The method may include, based on detecting the RFID tag, communicating, to a network device, an update for a shipping history. The method may include detecting, by a sensor associated with the package repository, a presence in a vicinity of the package repository. The method may include detecting that the RFID tag is outside a range of the RFID reader and, responsive to the RFID tag being outside the range of the RFID reader, transmitting at least a portion of sensor data captured subsequent to detecting the presence to the network device.

In another aspect, this disclosure may be directed to a method. The method may include detecting, by a sensor-enabled device of a package repository, an object at the package repository. The method may include transmitting an alert based on the object. An intended recipient of the alert may comprise a user device associated with the package repository. The method may include adding an indication of the object to an inventory of the package repository. The inventory may be accessible by the user device. The method may include detecting, by the sensor-enabled device, a presence in a vicinity of the package repository. The method may include capturing, via a camera associated with the sensor-enabled device, image data indicative of at least a portion of the vicinity. The method may include determining, by the sensor-enabled device, that the object has been removed from the package repository and removing the object from the inventory.

BRIEF DESCRIPTION OF THE DRAWINGS

Aspects of the herein described package monitoring systems and methods are described more fully with reference to the accompanying drawings, which provide examples. In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers may refer to like elements throughout the application.

FIG. 8 illustrates an exemplary architecture of a GPRS network.

DETAILED DESCRIPTION

Figure 1:
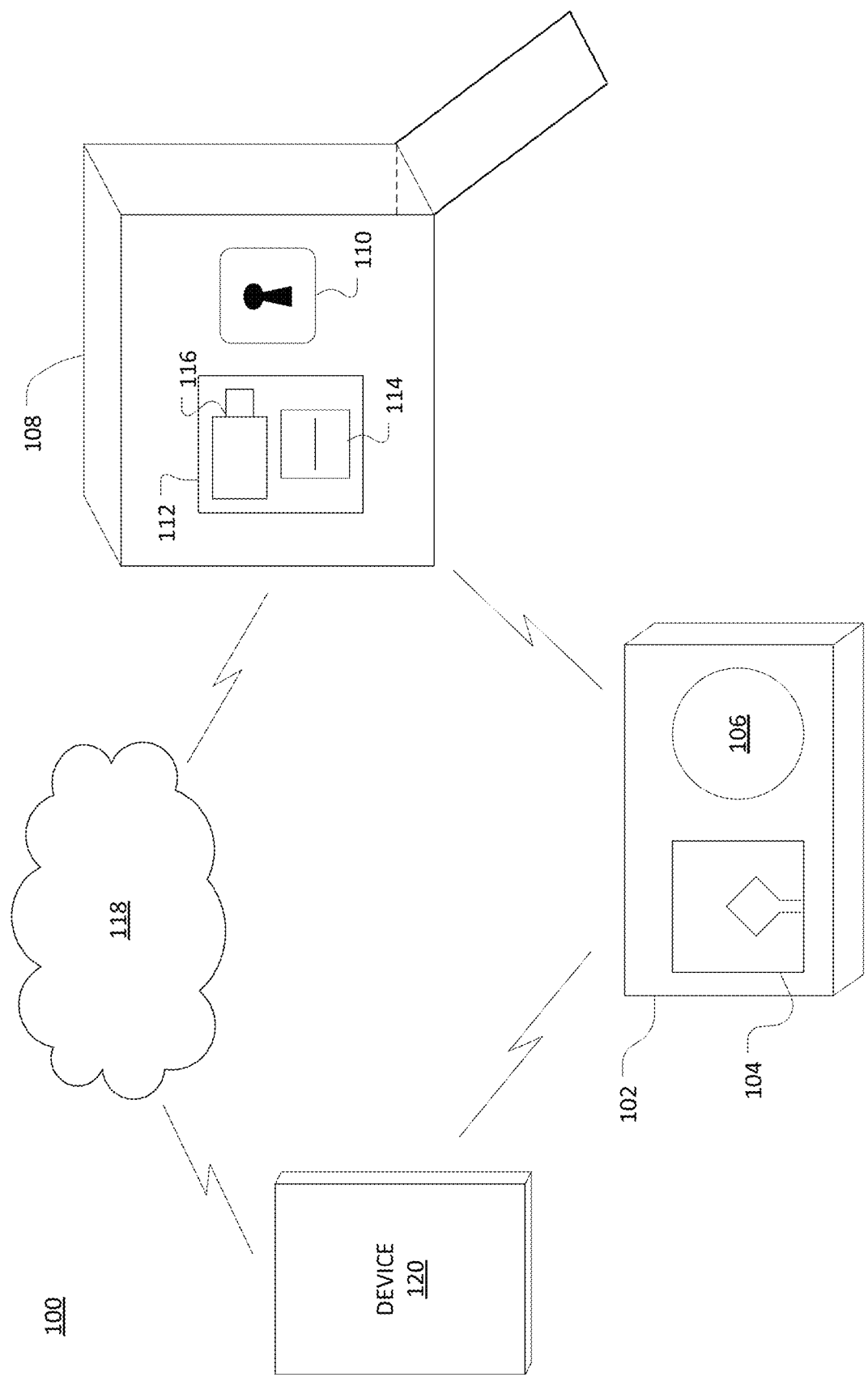
FIG. 1 illustrates an exemplary system in which the disclosed tracking technology may be implemented.

FIG. 1 illustrates an exemplary system 100 in which the disclosed tracking technology may be implemented to monitor a package 102. In an aspect, package 102 may be a physical object, such as an envelope, a parcel, or a box.

Package 102 may include an identifier 104. Identifier 104 may identify a destination, such as a waypoint or a final destination, of package 102. Identifier 104 may uniquely identify package 102. Identifier 104 may identify a sender, a recipient, a transporter, or a content of package 102. Additionally or alternatively, identifier 104 may identify a characteristic of package 102, such as an accessible temperature range for package 102, a value of package 102, or the like. In an aspect, identifier 104 may comprise an electronic identifier. For example, the electronic identifier may comprise a wireless tag, such as an active RFID tag, a passive RFID tag, a RuBee tag, or the like. In another aspect, identifier 104 may comprise a visual identifier, such as a bar code, a QR code, or the like.

Package 102 may comprise a sensor 106. Sensor 106 may detect and store sensor data regarding one or more characteristics of package 102. For example, sensor 106 may comprise a temperature sensor, a humidity sensor, an accelerometer, an electronic tag sensor (e.g., an RFID reader), a location sensor (e.g., a global positioning system (GPS) model), a pressure sensor (e.g., a force sensor), or the like. For example, sensor 106 may capture data that is indicative of a location of package 102, an aspect of how package 102 was handled, such as who handled package 102, whether package 102 was damaged, dropped, or exposed to too extreme temperatures, humidity, or the like. Sensor 106 may include memory to store sensor data, and a transceiver to transmit sensor data, such as via near field communications (NFC) or Bluetooth communications, or any other type of wired or wireless communications.

System 100 may include a package repository 108. Package repository 108 may be a mailbox, a cubbyhole. For example, package repository 108 may be partially or completely enclosable. While FIG. 1 illustrates package repository 108 as an enclosable container, package repository 108 may be a geographic location, such as a drop-off point for package 102. Package repository 108 may be associated with an address, one or more authorized users, or the like.

Optionally, package repository 108 may comprise a locking mechanism 110 to secure contents (or an enclosure) of package repository 108. For example, locking mechanism 110 may be a lock that, when engaged, may prevent a door or lid of package repository 108 from being opened. Additionally or alternatively, locking mechanism 110 may secure package 102 to package repository 108 when engaged. Locking mechanism 110 may operate electronically. For example, locking mechanism 110 may engage or disengage (e.g., locking or unlocking) in response to an electronic signal. For example, locking mechanism 110 may operate in response to wireless or wired communications, such as NFC or Bluetooth communications.

Package repository 108 may comprise a sensor system 112. Sensor system 112 may include one or more sensors to monitor package repository 108. For example, sensor system 112 may include a reader 114 that can read or detect identifier 104, such as an RFID reader or a barcode scanner. Sensor system 112 may detect whether package repository 108 is occupied or not. For example, sensor system 112 may detect package 102. Additionally or alternatively, sensor system 112 may detect motion or presence in a vicinity of package repository 108. For example, such motion or presence may be indicative of a person or entity approaching or accessing package repository 108.

For example, sensor system 112 may comprise a camera 116. Camera 116 may be configured to capture video, audio, or still image data. Sensor system 112 may comprise memory to store sensor data, such as that captured by reader 114 or camera 116. Additionally, sensor system 112 may comprise an input/output for communicating sensor data to a network, such as network 118.

In an aspect, network 118 may facilitate communications between two or more elements of system 100, including NFC, Bluetooth, Wi-Fi, or other wireless (or wired) communications. For example, system 100 may include a device 120 that receives communications indicative of sensor data from sensor 106 of package 102 or sensor system 112. For example, device 120 may be a server or central repository in which sensor data may be stored and communicated to one or more other devices 120. Additionally or alternatively, device 120 may be a user device, such as a personal computer, a tablet, a smart phone, a wearable device, or the like.

Figure 2:
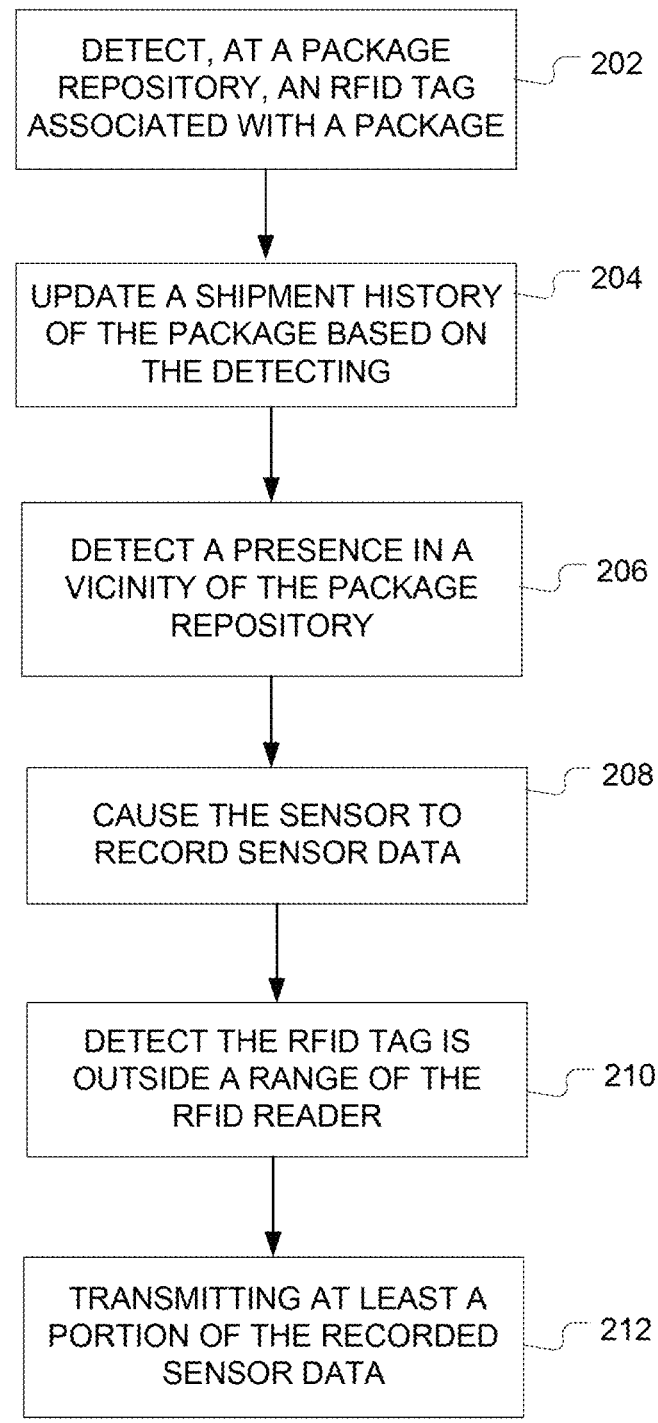
FIG. 2 is a flowchart of an exemplary method for tracking a package.

FIG. 2 is a flowchart of an exemplary method 200 that may be used to monitor packages 102. For example, method 200 may be used to provide information regarding package 102, such as via device 120.

At step 202, method 200 may include detecting package 102 at package repository 108. For example, this may include a force or pressure sensor of sensor system 112 detecting the physical presence of package 108. For example, such a sensor may measure the weight of package 102 on or in package repository 108. Additionally or alternatively, step 202 may include detecting, via reader 114, identifier 104 of package 102. For example, step 202 may include detecting, via RFID reader 114, an RFID tag of package 102. This detecting may indicate that package 102 has been delivered to package repository 108.

At step 204, method 200 may include updating a shipment history. In an aspect, a shipment history may be a history of shipments to or from package repository 108, a history of shipments to or from a particular user, a history of shipments of particular deliverer, or a history of shipment of a particular package 102. Updating the shipment history of package 102 may be based on detecting identifier 104 at package repository 108. That is, detecting identifier 104 at package repository may indicate that package 102 has arrived at a location of package repository 108.

At step 206, method 200 may include detecting a presence in a vicinity of package repository 108. For example, the vicinity may be a predefined distance from package repository 108 and detecting a presence may include sensor system 112 sensing motion near package repository 108. As another example, detecting a presence may include wirelessly sensing device 120, such as via NFC or Bluetooth. Sensor system 112 may detect a presence by other means, such as a temperature sensor, a touch sensor, or the like.

At step 208, method 200 may include causing sensor system 112, or a sensor of sensor system 112, to record sensor data. This may include storing sensor data already being captured by sensor system, or initiating a sensor to start recording sensor data. This may include, for example, capturing image or audio data via camera 116. This recording sensor data may be used, in the event package 102 is removed from package repository 108, as evidence of how package 102 was handled, or who (or what) took package 102 from package repository 108.

At step 210, method 200 may include detecting that package 102 has been removed from package repository 108. This detecting may be based on a change in sensor data. For example, step 210 may include reader 114 no longer being able to detect identifier 104, such as RFID tag of package 102. As another example, step 210 may include detecting a change in weight associated with package repository 108.

At step 212, method 200 may include, in response to detecting that package 102 is no longer at package repository 108, transmitting at least a portion of sensor data to the network. For example, this may include sending video data captured during the time package 102 was moved from package repository 108.

Figure 3:
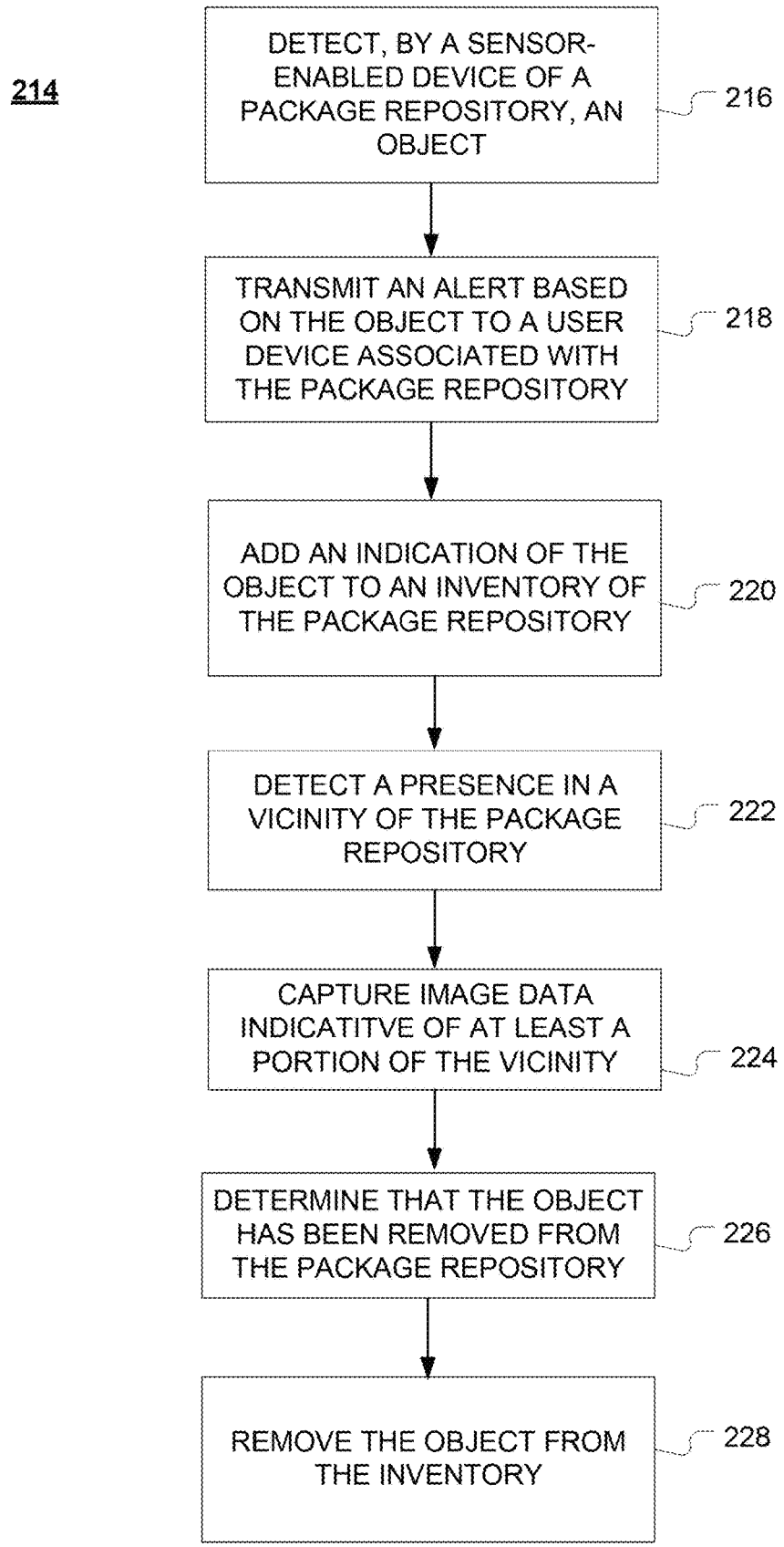
FIG. 3 is a flowchart of an exemplary method for tracking a package.

FIG. 3 illustrates another method 214 that may be used to monitor packages 102. At step 216, method 214 may include detecting, by a sensor-enabled device, such as sensor system 112, an object, such as package 102, at package repository 108. This may include sensing identifier 104 of package 102, a sensed forced or pressure, or the like.

At step 218, method 214 may include transmitting an alert based on detecting the object, such as package 102, in step 216. The intended recipient of the alert may include user device 120 associated with package repository 108. For example, user device 120 may be linked with package repository 108. For example, user device 120 may be associated with a person who receives or packages 102 at package repository 108. As another example, user device 120 may be associated with the sender or transporter of package 102. As yet another example, the alert may be transmitted to device 120 for storing a shipping history associated with package 102 or package repository 108.

For example, at step 220, method 214 may include adding an indication of object (e.g., package 102) to an inventory of package repository. An inventory of package repository 108 may indicate a current inventory of package repository 108. For example, the inventory may be as simple as indicating that package repository 108 is non-empty. Further, inventory may indicate a total number of the contents of package repository 108 and may include identifiers 104 of one or more packages 102. Optionally, the inventory may include historical records of the inventory of package repository.

At step 222, method 214 may include detecting a presence in a vicinity of package repository 108. For example, the vicinity may be a predefined distance from package repository 108 and detecting a presence may include sensor system 112 sensing motion near package repository 108. As another example, detecting a presence may include wirelessly sensing device 120, such as via NFC or Bluetooth. Sensor system 112 may detect a presence by other means, such as a temperature sensor, a touch sensor, or the like.

At step 224, method 214 may include capturing, via camera 116 of package repository 108, image data indicative of at least a portion of the vicinity. The image data may comprise video data. Optionally, the data captured by camera 116 may include audio data.

At step 226, method 214 may include detecting that package 102 has been removed from package repository 108. This detecting may be based on a change in sensor data. For example, step 226 may include reader 114 no longer being able to detect identifier 104, such as RFID tag of package 102. As another example, step 226 may include detecting a change in weight associated with package repository 108.

At step 228, responsive to determining that the object (e.g., package 102) has been removed from the package repository, the inventory may be updated. This may include indicating on the inventory that object is no longer at package repository 108.

The steps of methods 200 and 214 may be combined together in one or more combinations. As another example, additional steps may be included. For example, communicating alerts regarding package repository 108 or package 102 may be included. User device 120 associated with package 102 or package repository 108 may be alerted to the arrival of package 102 at package repository 108. For example, such an alert may be communicated upon determining that package repository 108 is a destination of package 102, as opposed to, for example, a waypoint along a planned shipping route. As another example, alerts may be sent to user devices 120 associated with package repository 108 (e.g., recipients or transporters authorized to receive or drop off packages 102 at package repository 108), or user devices 120 associated with package 102 (e.g., recipients, senders, or transporters of package 102). Alerts may be sent regarding a change related to package 102 or package repository 108, such as package 102 arriving at package repository 108, package 102 being removed from package repository 108, or an attempt to move package 102 or access package repository 108.

These alerts may include more or different information regarding package repository 108 or package 102. For example, an alert may indicate a condition of package 102 or package repository 108, such as data collected by one or more of package sensor 106 or sensor system 112. For example, the alert may contain sensor data, such as temperature, humidity, pressure, acceleration, or image data, captured by package sensor 106 or sensor system 112. Additionally or alternatively, the alert may contain a status of package 102 or package repository 108 based on such sensor data. For example, based on humidity sensor data, the alert may indicate that package 102 has been exposed to liquid. As another example, based on acceleration data or force data, the alert may indicate that package 102 has been dropped or otherwise rough-handled.

Sending alerts may be triggered based on a combination of factors, such as delivery or removal of package 102, whether an authorized user device 120 was detected when a presence in the vicinity of package repository 108 was detected, a change in physical condition of package 102 or package repository 108, or the like. Similarly, the content of the alert may depend upon the triggering condition, the recipient of the alert, or the like. For example, if package 102 was removed from package repository 108, an alert to user device 120 associated with a sender of package 102 may indicate that package 102 was received, while an alert to user device 120 associated with package 102 or package repository 108 may include image data captured when package 102 was received. Further, whether the alert comprises image data may be based on whether user device 120 associated with package 102 or package repository 108 was detected when package 102 was removed from package repository 108. Removal of package 102 from package repository 108 may be based on no longer being able to detect identifier 104 with reader 114.

Such sensor data may also be used to update a shipping history (or inventory) of package 102 or package repository 108. For example, a shipping history of package 102 may indicate that prior to reaching a particular package repository 108, package 102 was dropped. This data may be used to assess insurance claims or determine liability for damage to package 102. For example, this data may be used to alter the price charged or payment to be received for shipping package 102.

Figure 4:
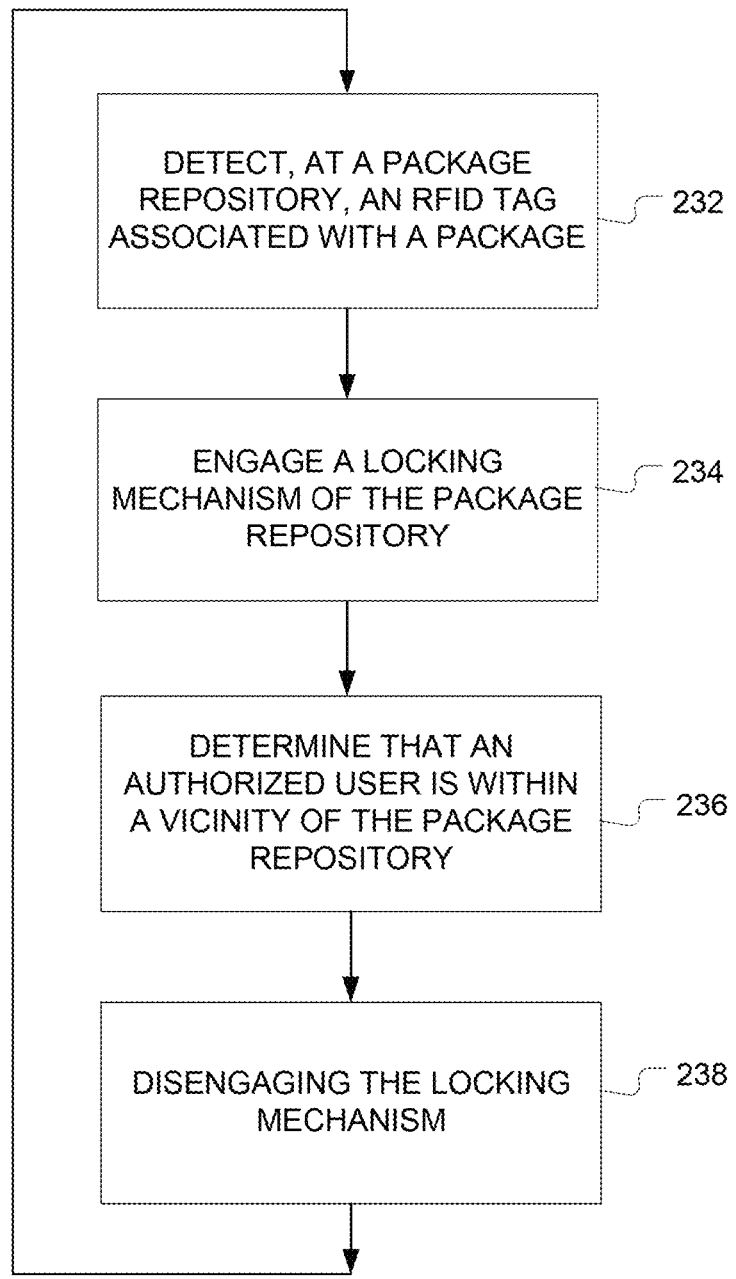
FIG. 4 is a flowchart for engaging a locking mechanism of a package repository.

FIG. 4 is a flowchart of an exemplary method 230 for operating locking mechanism 110 of package repository 108. At step 232, method 230 may include detecting, at package repository 108, package 102. This may include, for example, step 202 or step 216 of FIGS. 2 and 3, respectively. For example, this may include detecting identifier 104 of package 102.

At step 234, method 230 may include engaging locking mechanism 110. For example, engaging locking mechanism 110 may include electronically operating locking mechanism 110 to place it in a locked or secured mode. Once engaged, locking mechanism 110 may prevent removal of or access to package 102 or package repository 108.

At step 236, method 230 may include determining that an authorized user (e.g., user device 120) is in a vicinity of package repository 108. This may include an authorized user associated with package 102 or package repository 108. This step may include wirelessly detecting, by sensing system 112, user device 120. Wirelessly detecting user device 120 may include Bluetooth or near-field communications.

At step 238, in response to detecting user device 120, method 230 may include disengaging, or unlocking, locking mechanism 110. This may allow the authorized user to remove package 102 from package repository 108. The method may repeat. For example, after a timeout period, if package 102 has not been removed (e.g., determined by detecting package 102), then locking mechanism 110 may be engaged.

Figure 5:
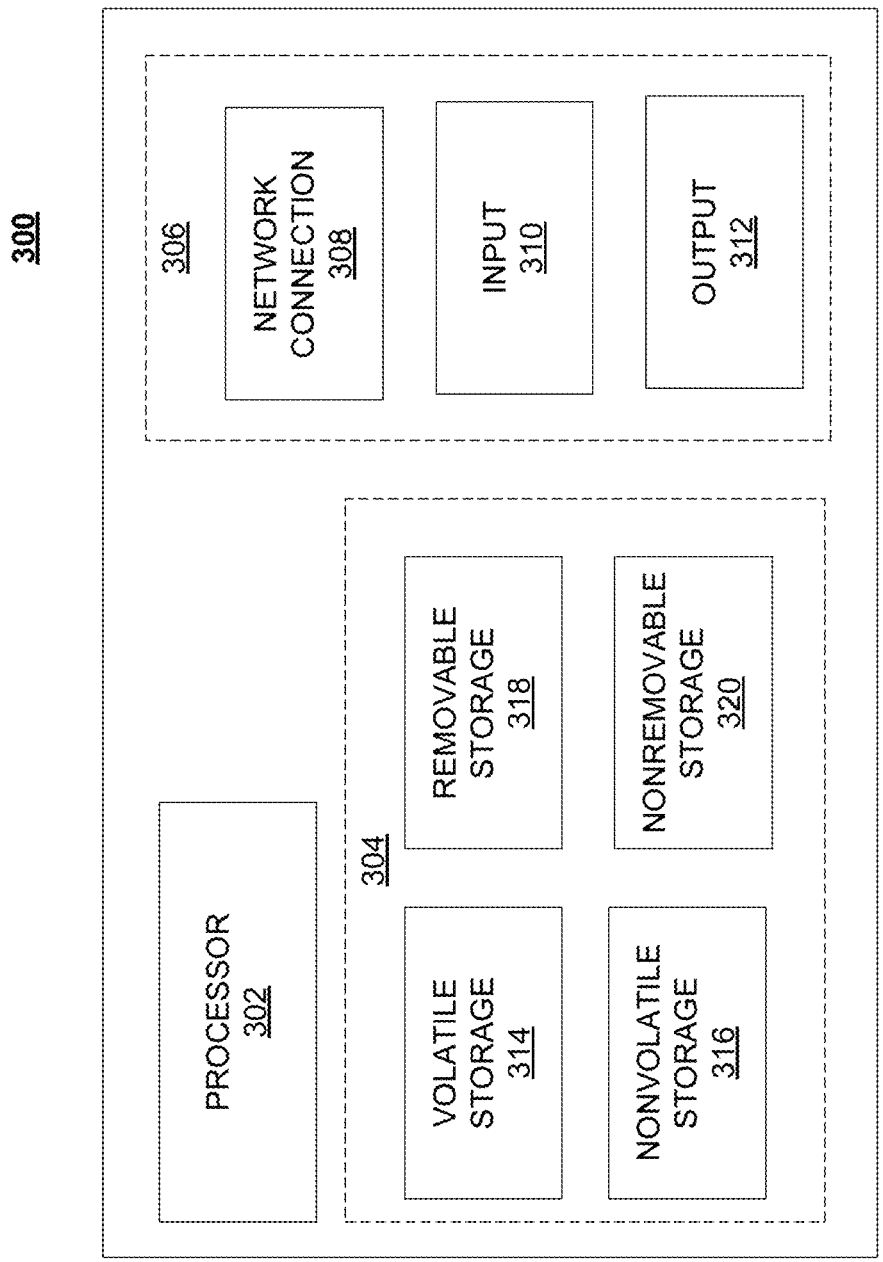
FIG. 5 is schematic of an exemplary network device.

FIG. 5 is a block diagram of a network device 300. Network device 300 may be used for detecting traffic events or displaying alerts of traffic events. Network device 300 may be connected to or comprise a component of telecommunication system 100. For example, one or more of devices 120, sensor systems 112 may comprise all or a portion of network device 300. Network device 300 may comprise hardware or a combination of hardware and software.

The functionality to facilitate telecommunications via a telecommunications network may reside in one or a combination of network devices 300. Network device 300 depicted in FIG. 5 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an ALFS, a gateway mobile location center (GMLC), a radio access network (RAN), a serving mobile location center (SMLC), or the like, or any appropriate combination thereof. It is emphasized that the block diagram depicted in FIG. 5 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 5) to allow communications therebetween. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/5G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, Zig-Bee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 may also contain one or more network connections 308 that allows network device 300 to facilitate communications between devices 120 and networks. Network connections 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 for receiving user inputs, such as keyboard, mouse, pen, voice input device, or touch input device. Input/output system 306 may also include an output device 312, such as a display, speakers, vibration outputs, or a printer.

For example, device 120 may comprise network device 300 in which input/output system 306 may include an IEEE 802.11-compliant transceiver. Optionally, input/output system 306 of device 120 may also include a transceiver for communicating with a cellular network, such as network 118.

Processor 302 may be capable of performing functions associated with telecommunications, such as functions for generating or processing alerts, as described herein. For example, processor 302 may be capable of, in conjunction with any other portion of network device 300, providing sensor data or traffic flow patterns to determine traffic events, identifying recipients of an alert of a traffic event, transmitting alerts of traffic events, or receiving alerts of traffic events, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a nonremovable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to generate, transmit, or receive alerts of traffic events.

Figure 6:
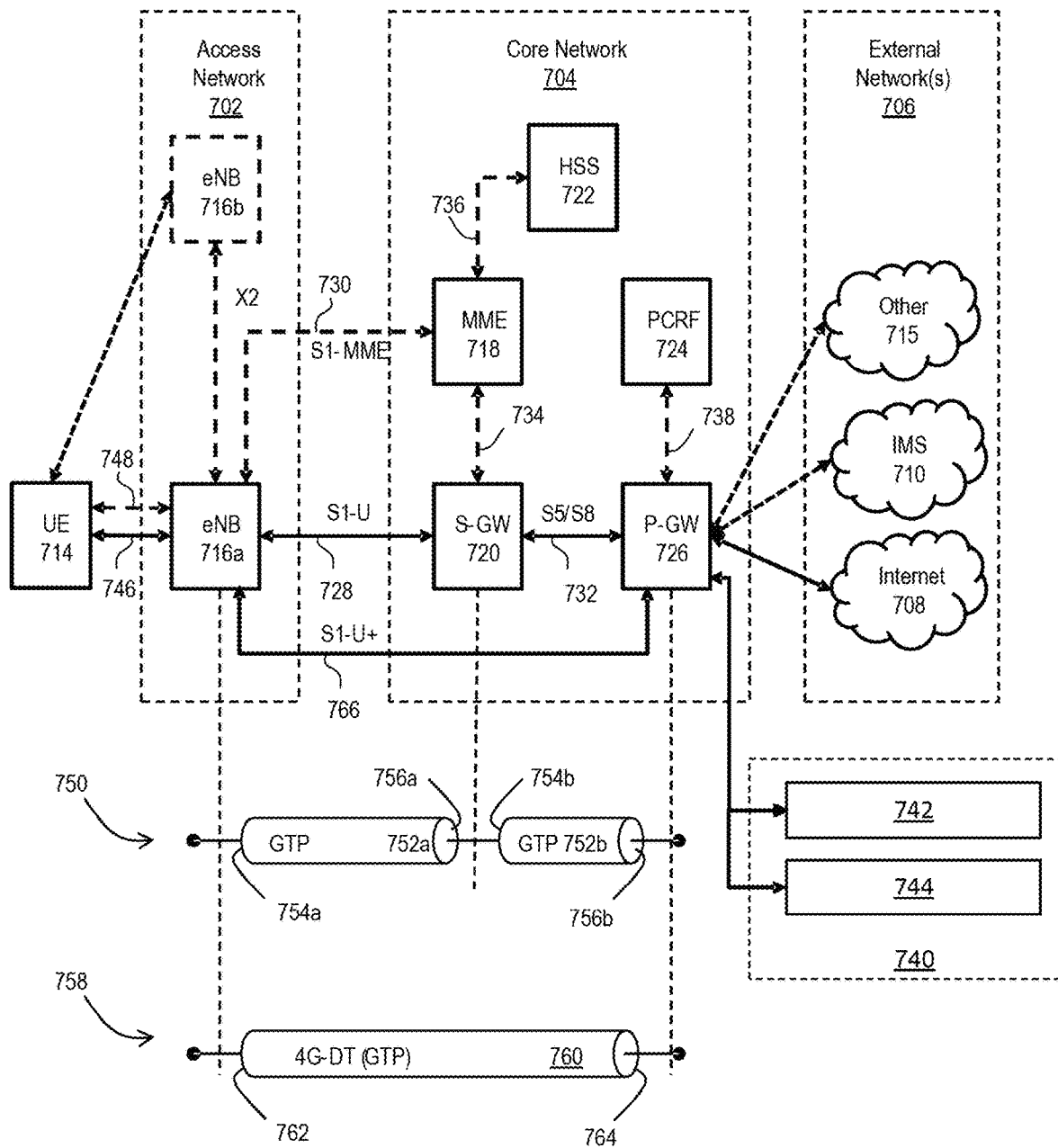
FIG. 6 is an exemplary network architecture.

FIG. 6 illustrates a functional block diagram depicting one example of an LTE-EPS network architecture 700 related to the current disclosure. In particular, the network architecture 700 disclosed herein is referred to as a modified LTE-EPS architecture 700 to distinguish it from a traditional LTE-EPS architecture.

An example modified LTE-EPS architecture 700 is based at least in part on standards developed by the 3rd Generation Partnership Project (3GPP), with information available at www.3gpp.org. In one embodiment, the LTE-EPS network architecture 700 includes an access network 702, a core network 704, e.g., an EPC or Common BackBone (CBB) and one or more external networks 706, sometimes referred to as PDN or peer entities. Different external networks 706 can be distinguished from each other by a respective network identifier, e.g., a label according to DNS naming conventions describing an access point to the PDN. Such labels can be referred to as Access Point Names (APN). External networks 706 can include one or more trusted and non-trusted external networks such as an internet protocol (IP) network 708, an IP multimedia subsystem (IMS) network 710, and other networks 712, such as a service network, a corporate network, or the like. Network 804 or network 114 may include one or more access networks 702, core networks 704, or an external networks 706.

Access network 702 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 702 can include one or more communication devices, commonly referred to as UE 714, and one or more wireless access nodes, or base stations 716a, 716b. During network operations, at least one base station 716 communicates directly with UE 714. Base station 716 can be an evolved Node B (e-NodeB), with which UE 714 communicates over the air and wirelessly. UEs 714 can include, without limitation, wireless devices, e.g., satellite communication systems, portable digital assistants (PDAs), laptop computers, tablet devices and other mobile devices (e.g., cellular telephones, smart appliances, and so on). UEs 714 can connect to eNBs 716 when UE 714 is within range according to a corresponding wireless communication technology.

UE 714 generally runs one or more applications that engage in a transfer of packets between UE 714 and one or more external networks 706. Such packet transfers can include one of downlink packet transfers from external network 706 to UE 714, uplink packet transfers from UE 714 to external network 706 or combinations of uplink and downlink packet transfers. Applications can include, without limitation, web browsing, VoIP, streaming media and the like. Each application can pose different Quality of Service (QoS) requirements on a respective packet transfer. Different packet transfers can be served by different bearers within core network 704, e.g., according to parameters, such as the QoS.

Core network 704 uses a concept of bearers, e.g., EPS bearers, to route packets, e.g., IP traffic, between a particular gateway in core network 704 and UE 714. A bearer refers generally to an IP packet flow with a defined QoS between the particular gateway and UE 714. Access network 702, e.g., E UTRAN, and core network 704 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

Core network 704 may include various network entities, such as MME 718, SGW 720, Home Subscriber Server (HSS) 722, Policy and Charging Rules Function (PCRF) 724 and PGW 726. For example, MME 718 may include a control node performing a control signaling between various equipment and devices in access network 702 and core network 704. The protocols running between UE 714 and core network 704 are generally known as Non-Access Stratum (NAS) protocols.

For illustration purposes only, the terms MME 718, SGW 720, HSS 722 and PGW 726, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 720 routes and forwards all user data packets. SGW 720 also acts as a mobility anchor for user plane operation during handovers between base stations, e.g., during a handover from first eNB 716a to second eNB 716b as may be the result of UE 714 moving from one area of coverage, e.g., cell, to another. SGW 720 can also terminate a downlink data path, e.g., from external network 706 to UE 714 in an idle state, and trigger a paging operation when downlink data arrives for UE 714. SGW 720 can also be configured to manage and store a context for UE 714, e.g., including one or more of parameters of the IP bearer service and network internal routing information. In addition, SGW 720 can perform administrative functions, e.g., in a visited network, such as collecting information for charging (e.g., the volume of data sent to or received from the user), or replicate user traffic, e.g., to support a lawful interception. SGW 720 also serves as the mobility anchor for interworking with other 3GPP technologies such as universal mobile telecommunication system (UMTS).

At any given time, UE 714 is generally in one of three different states: detached, idle, or active. The detached state is typically a transitory state in which UE 714 is powered on but is engaged in a process of searching and registering with network 702. In the active state, UE 714 is registered with access network 702 and has established a wireless connection, e.g., radio resource control (RRC) connection, with eNB 716. Whether UE 714 is in an active state can depend on the state of a packet data session, and whether there is an active packet data session. In the idle state, UE 714 is generally in a power conservation state in which UE 714 typically does not communicate packets. When UE 714 is idle, SGW 720 can terminate a downlink data path, e.g., from a peer entity such as network 706, and triggers paging of UE 714 when data arrives for UE 714. If UE 714 responds to the page, SGW 720 can forward the IP packet to eNB 716*a*.

HSS 722 can manage subscription-related information for a user of UE 714. For example, tHSS 722 can store information such as authorization of the user, security requirements for the user, quality of service (QoS) requirements for the user, etc. HSS 722 can also hold information about external networks 706 to which the user can connect, e.g., in the form of an APN of external networks 706. For example, MME 718 can communicate with HSS 722 to determine if UE 714 is authorized to establish a call, e.g., a voice over IP (VoIP) call before the call is established.

PCRF 724 can perform QoS management functions and policy control. PCRF 724 is responsible for policy control decision-making, as well as for controlling the flow-based charging functionalities in a policy control enforcement function (PCEF), which resides in PGW 726. PCRF 724 provides the QoS authorization, e.g., QoS class identifier and bit rates that decide how a certain data flow will be treated in the PCEF and ensures that this is in accordance with the user's subscription profile.

PGW 726 can provide connectivity between the UE 714 and one or more of the external networks 706. In illustrative network architecture 700, PGW 726 can be responsible for IP address allocation for UE 714, as well as one or more of QoS enforcement and flow-based charging, e.g., according to rules from the PCRF 724. PGW 726 is also typically responsible for filtering downlink user IP packets into the different QoS-based bearers. In at least some embodiments, such filtering can be performed based on traffic flow templates. PGW 726 can also perform QoS enforcement, e.g., for guaranteed bit rate bearers. PGW 726 also serves as a mobility anchor for interworking with non-3GPP technologies such as CDMA2000.

Within access network 702 and core network 704 there may be various bearer paths/interfaces, e.g., represented by solid lines 728 and 730. Some of the bearer paths can be referred to by a specific label. For example, solid line 728 can be considered an S1-U bearer and solid line 732 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 704 can include various signaling bearer paths/interfaces, e.g., control plane paths/interfaces represented by dashed lines 730, 734, 736, and 738. Some of the signaling bearer paths may be referred to by a specific label. For example, dashed line 730 can be considered as an S1-MME signaling bearer, dashed line 734 can be considered as an S11 signaling bearer and dashed line 736 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 766. In the illustrative example, the S1-U+ user plane interface extends between the eNB 716*a* and PGW 726. Notably, S1-U+ path/interface does not include SGW 720, a node that is otherwise instrumental in configuring and/or managing packet forwarding between eNB 716*a* and one or more external networks 706 by way of PGW 726. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 720, 726 due to excessive handover events.

In some embodiments, PGW 726 is coupled to storage device 740, shown in phantom. Storage device 740 can be integral to one of the network nodes, such as PGW 726, for example, in the form of internal memory and/or disk drive. It is understood that storage device 740 can include registers suitable for storing address values. Alternatively or in addition, storage device 740 can be separate from PGW 726, for example, as an external hard drive, a flash drive, and/or network storage.

Storage device 740 selectively stores one or more values relevant to the forwarding of packet data. For example, storage device 740 can store identities and/or addresses of network entities, such as any of network nodes 718, 720, 722, 724, and 726, eNBs 716 and/or UE 714. In the illustrative example, storage device 740 includes a first storage location 742 and a second storage location 744. First storage location 442 can be dedicated to storing a Currently Used Downlink address value 742. Likewise, second storage location 744 can be dedicated to storing a Default Downlink Forwarding address value 444. PGW 726 can read and/or write values into either of storage locations 742, 744, for example, managing Currently Used Downlink Forwarding address value 742 and Default Downlink Forwarding address value 744 as disclosed herein.

In some embodiments, the Default Downlink Forwarding address for each EPS bearer is the SGW S5-U address for each EPS Bearer. The Currently Used Downlink Forwarding address" for each EPS bearer in PGW 726 can be set every time when PGW 726 receives an uplink packet, e.g., a GTP-U uplink packet, with a new source address for a corresponding EPS bearer. When UE 714 is in an idle state, the "Current Used Downlink Forwarding address" field for each EPS bearer of UE 714 can be set to a "null" or other suitable value.

In some embodiments, the Default Downlink Forwarding address is only updated when PGW 726 receives a new SGW S5-U address in a predetermined message or messages. For example, the Default Downlink Forwarding address is only updated when PGW 726 receives one of a Create Session Request, Modify Bearer Request and Create Bearer Response messages from SGW 720.

As values 742, 744 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that access network 702 and core network 704 are illustrated in a simplified block diagram in FIG. 6. In other words, either or both of access network 702 and the core network 704 can include additional network elements that are not shown, such as various routers, switches and controllers. In addition, although FIG. 6 illustrates only a single one of each of the various network elements, it should be noted that access network 702 and core network 704 can include any number of the various network elements. For example, core network 704 can include a pool (i.e., more than one) of MMEs 718, SGWs 720 or PGWs 726.

In the illustrative example, data traversing a network path between UE 714, eNB 716a, SGW 720, PGW 726 and external network 706 may be considered to constitute data transferred according to an end-to-end IP service. However, for the present disclosure, to properly perform establishment management in LTE-EPS network architecture 700, the core network, data bearer portion of the end-to-end IP service is analyzed.

An establishment may be defined herein as a connection set up request between any two elements within LTE-EPS network architecture 700. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 746) between UE 714 and eNB 716a, a second portion (e.g., an S1 data bearer 728) between eNB 716a and SGW 720, and a third portion (e.g., an S5/S8 bearer 732) between SGW 720 and PGW 726. Various signaling bearer portions are also illustrated in FIG. 6. For example, a first signaling portion (e.g., a signaling radio bearer 748) between UE 714 and eNB 716a, and a second signaling portion (e.g., S1 signaling bearer 730) between eNB 716a and MME 718.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of network architecture 700, e.g., by one or more of tunnel endpoint identifiers, an IP address and a user datagram protocol port number. Within a particular tunnel connection, payloads, e.g., packet data, which may or may not include protocol related information, are forwarded between tunnel endpoints.

An example of first tunnel solution 750 includes a first tunnel 752a between two tunnel endpoints 754a and 756a, and a second tunnel 752b between two tunnel endpoints 754b and 756b. In the illustrative example, first tunnel 752a is established between eNB 716a and SGW 720. Accordingly, first tunnel 752a includes a first tunnel endpoint 754a corresponding to an S1-U address of eNB 716a (referred to herein as the eNB S1-U address), and second tunnel endpoint 756a corresponding to an S1-U address of SGW 720 (referred to herein as the SGW S1-U address). Likewise, second tunnel 752b includes first tunnel endpoint 754b corresponding to an S5-U address of SGW 720 (referred to herein as the SGW S5-U address), and second tunnel endpoint 756b corresponding to an S5-U address of PGW 726 (referred to herein as the PGW S5-U address).

In at least some embodiments, first tunnel solution 750 is referred to as a two tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 758 includes a single or direct tunnel 760 between tunnel endpoints 762 and 764. In the illustrative example, direct tunnel 760 is established between eNB 716a and PGW 726, without subjecting packet transfers to processing related to SGW 720. Accordingly, direct tunnel 760 includes first tunnel endpoint 762 corresponding to the eNB S1-U address, and second tunnel endpoint 764 corresponding to the PGW S5-U address. Packet data received at either end can be encapsulated into a payload and directed to the corresponding address of the other end of the tunnel. Such direct tunneling avoids processing, e.g., by SGW 720 that would otherwise relay packets between the same two endpoints, e.g., according to a protocol, such as the GTP-U protocol.

In some scenarios, direct tunneling solution 758 can forward user plane data packets between eNB 716a and PGW 726, by way of SGW 720. That is, SGW 720 can serve a relay function, by relaying packets between two tunnel endpoints 716a, 726. In other scenarios, direct tunneling solution 758 can forward user data packets between eNB 716a and PGW 726, by way of the S1 U+ interface, thereby bypassing SGW 720.

Generally, UE 714 can have one or more bearers at any one time. The number and types of bearers can depend on applications, default requirements, and so on. It is understood that the techniques disclosed herein, including the configuration, management and use of various tunnel solutions 750, 758, can be applied to the bearers on an individual bases. That is, if user data packets of one bearer, say a bearer associated with a VoIP service of UE 714, then the forwarding of all packets of that bearer are handled in a similar manner. Continuing with this example, the same UE 714 can have another bearer associated with it through the same eNB 716a. This other bearer, for example, can be associated with a relatively low rate data session forwarding user data packets through core network 704 simultaneously with the first bearer. Likewise, the user data packets of the other bearer are also handled in a similar manner, without necessarily following a forwarding path or solution of the first bearer. Thus, one of the bearers may be forwarded through direct tunnel 758; whereas, another one of the bearers may be forwarded through a two-tunnel solution 750.

Figure 7:
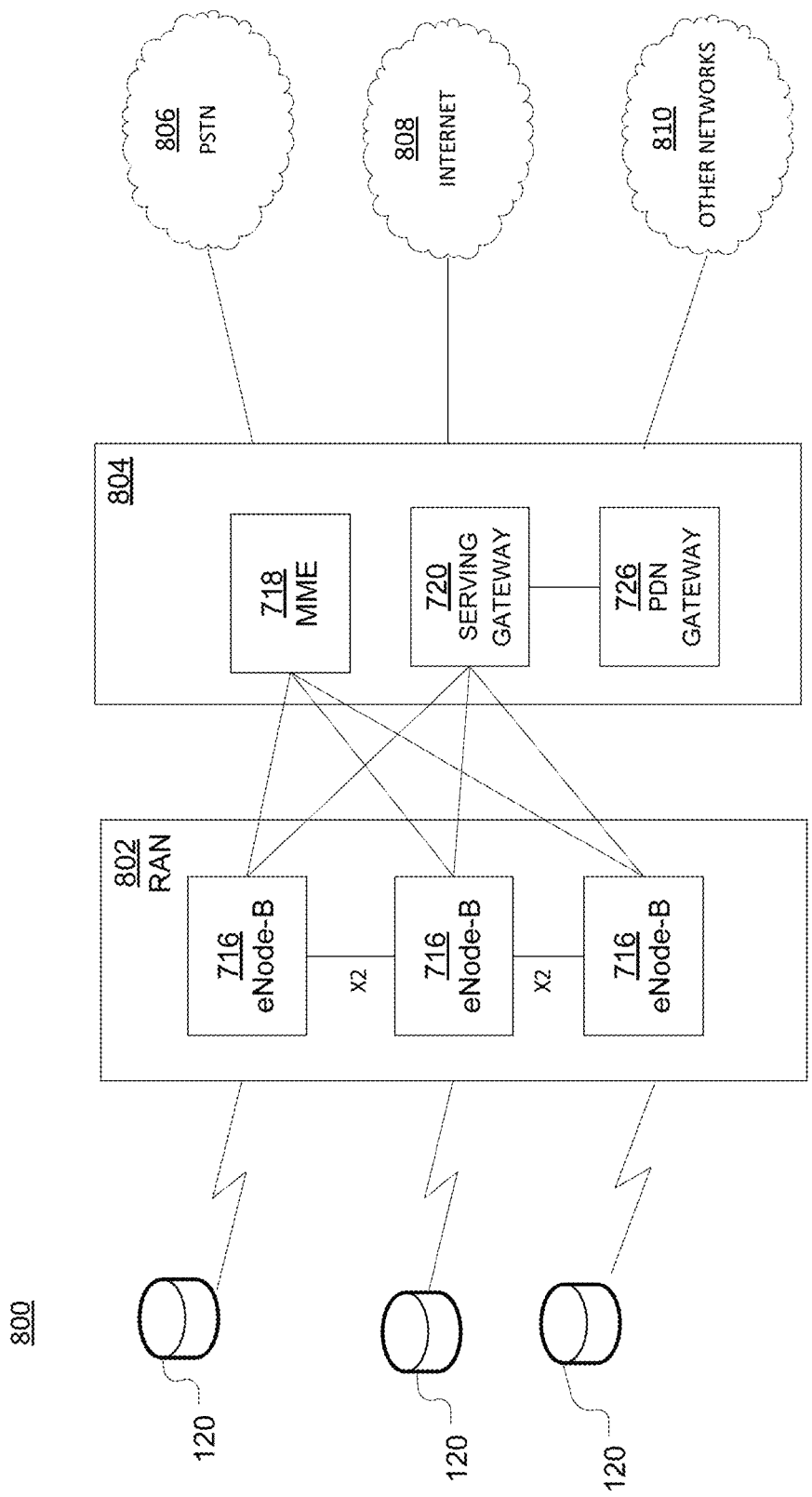
FIG. 7 is an exemplary network architecture.

FIG. 7 is an example system 800 including a radio access network (RAN) 802 and a core network 804. As noted above, RAN 802 may employ an E-UTRA radio technology to communicate with devices 120 over air interface. RAN 802 may also be in communication with core network 804.

RAN 802 may include any number of eNode-Bs 716 while remaining consistent with the disclosed technology. One or more eNode-Bs 716 may include one or more transceivers for communicating with the devices 120 over air interface. Optionally, eNode-Bs 716 may implement MIMO technology. Thus, one of eNode-Bs 716, for example, may use multiple antennas to transmit wireless signals to, or receive wireless signals from, one of Devices 120.

Each of eNode-Bs 716 may be associated with a particular cell (not shown) and may be configured to handle radio resource management decisions, handover decisions, scheduling of users in the uplink or downlink, or the like. As shown in FIG. 6, eNode-Bs 716 may communicate with one another over an X2 interface.

Core network 804 shown in FIG. 7 may include a mobility management gateway or entity (MME) 718, a serving gateway 720, or a packet data network (PDN) gateway 726. While each of the foregoing elements are depicted as part of core network 804, it will be appreciated that any one of these elements may be owned or operated by an entity other than the core network operator.

MME 718 may be connected to each of eNode-Bs 716 in RAN 802 via an S1 interface and may serve as a control node. For example, MME 718 may be responsible for authenticating users of devices 120, bearer activation or deactivation, selecting a particular serving gateway during an initial attach of devices 120, or the like. MME 718 may also provide a control plane function for switching between RAN 802 and other RANs (not shown) that employ other radio technologies, such as GSM or WCDMA.

Serving gateway 720 may be connected to each of eNode-Bs 716 in RAN 802 via the S1 interface. Serving gateway 720 may generally route or forward user data packets to or from the devices 120. Serving gateway 720 may also perform other functions, such as anchoring user planes during inter-eNode B handovers, triggering paging when downlink data is available for devices 120, managing or storing contexts of devices 120, or the like.

Serving gateway 720 may also be connected to PDN gateway 726, which may provide devices 120 with access to packet-switched networks, such as the Internet 808, to facilitate communications between devices 120 and IP-enabled devices.

Core network 804 may facilitate communications with other networks. For example, core network 804 may provide devices 120 with access to circuit-switched networks, such as a PSTN 806, to facilitate communications between devices 120 and traditional land-line communications devices. In addition, core network 804 may provide the devices 120 with access to other networks 810, which may include other wired or wireless networks that are owned or operated by other service providers.

Generally, there may be a several cell sizes in a network, referred to as macro, micro, pico, femto or umbrella cells. The coverage area of each cell is different in different environments. Macro cells can be regarded as cells in which the base station antenna is installed in a mast or a building above average roof top level. Micro cells are cells whose antenna height is under average roof top level. Micro cells are typically used in urban areas. Pico cells are small cells having a diameter of a few dozen meters. Pico cells are used mainly indoors. Femto cells have the same size as pico cells, but a smaller transport capacity. Femto cells are used indoors, in residential or small business environments. On the other hand, umbrella cells are used to cover shadowed regions of smaller cells and fill in gaps in coverage between those cells.

Figure 8:
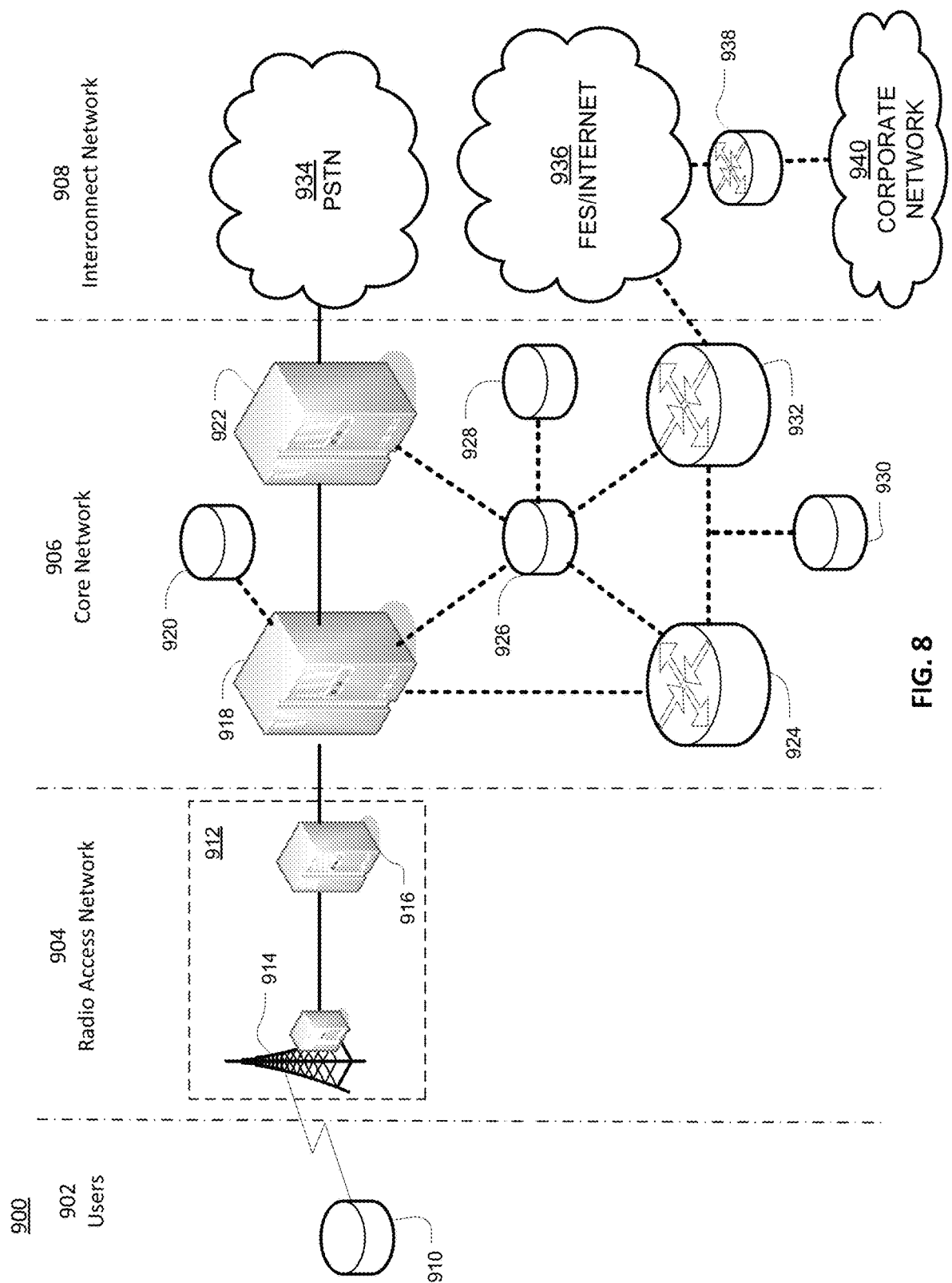
FIG. 8 depicts an exemplary communication system that provides wireless telecommunication services over wireless communication networks.

FIG. 8 illustrates an architecture of a typical GPRS network 900 as described herein. The architecture depicted in FIG. 8 may be segmented into four groups: users 902, RAN 904, core network 906, and interconnect network 908. Users 902 comprise a plurality of end users, who each may use one or more devices 910. Note that device 910 is referred to as a mobile subscriber (MS) in the description of network shown in FIG. 8. In an example, device 910 comprises a communications device (e.g., device 120, network device 300, or the like, or any combination thereof). Radio access network 904 comprises a plurality of BSSs such as BSS 912, which includes a BTS 914 and a BSC 916. Core network 906 may include a host of various network elements. As illustrated in FIG. 8, core network 906 may comprise MSC 918, service control point (SCP) 920, gateway MSC (GMSC) 922, SGSN 924, home location register (HLR) 926, authentication center (AuC) 928, domain name system (DNS) server 930, and GGSN 932.

Interconnect network 908 may also comprise a host of various networks or other network elements. As illustrated in FIG. 8, interconnect network 908 comprises a PSTN 934, an FES/Internet 936, a firewall 1038, or a corporate network 940.

An MSC can be connected to a large number of BSCs. At MSC 918, for instance, depending on the type of traffic, the traffic may be separated in that voice may be sent to PSTN 934 through GMSC 922, or data may be sent to SGSN 924, which then sends the data traffic to GGSN 932 for further forwarding.

When MSC 918 receives call traffic, for example, from BSC 916, it sends a query to a database hosted by SCP 920, which processes the request and issues a response to MSC 918 so that it may continue call processing as appropriate.

HLR 926 is a centralized database for users to register to the GPRS network. HLR 926 stores static information about the subscribers such as the International Mobile Subscriber Identity (IMSI), subscribed services, or a key for authenticating the subscriber. HLR 926 also stores dynamic subscriber information such as the current location of the MS. Associated with HLR 926 is AuC 928, which is a database that contains the algorithms for authenticating subscribers and includes the associated keys for encryption to safeguard the user input for authentication.

In the following, depending on context, "mobile subscriber" or "MS" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 8, when MS 910 initiates the attach process by turning on the network capabilities of the mobile device, an attach request is sent by MS 910 to SGSN 924. The SGSN 924 queries another SGSN, to which MS 910 was attached before, for the identity of MS 910. Upon receiving the identity of MS 910 from the other SGSN, SGSN 924 requests more information from MS 910. This information is used to authenticate MS 910 together with the information provided by HLR 926. Once verified, SGSN 924 sends a location update to HLR 926 indicating the change of location to a new SGSN, in this case SGSN 924. HLR 926 notifies the old SGSN, to which MS 910 was attached before, to cancel the location process for MS 910. HLR 926 then notifies SGSN 924 that the location update has been performed. At this time, SGSN 924 sends an Attach Accept message to MS 910, which in turn sends an Attach Complete message to SGSN 924.

Next, MS 910 establishes a user session with the destination network, corporate network 940, by going through a Packet Data Protocol (PDP) activation process. Briefly, in the process, MS 910 requests access to the Access Point Name (APN), for example, UPS.com, and SGSN 924 receives the activation request from MS 910. SGSN 924 then initiates a DNS query to learn which GGSN 932 has access to the UPS.com APN. The DNS query is sent to a DNS server within core network 906, such as DNS server 930, which is provisioned to map to one or more GGSNs in core network 906. Based on the APN, the mapped GGSN 932 can access requested corporate network 940. SGSN 924 then sends to GGSN 932 a Create PDP Context Request message that contains necessary information. GGSN 932 sends a Create PDP Context Response message to SGSN 924, which then sends an Activate PDP Context Accept message to MS 910.

Once activated, data packets of the call made by MS 910 can then go through RAN 904, core network 906, and interconnect network 908, in a particular FES/Internet 936 and firewall 1038, to reach corporate network 940.

Figure 9:
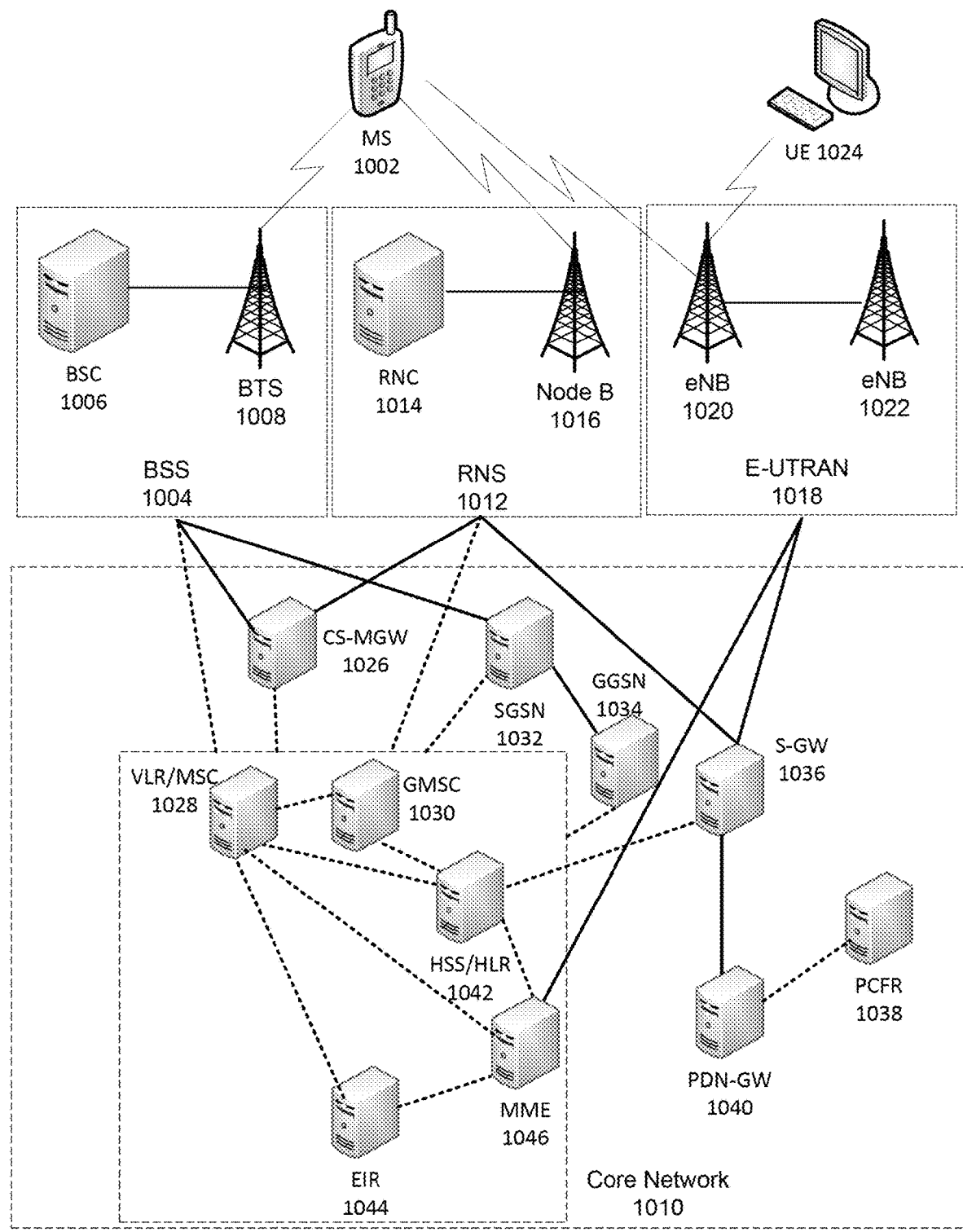
FIG. 9 is a block diagram of an exemplary public land mobile network (PLMN).

FIG. 9 illustrates a PLMN block diagram view of an example architecture that may be replaced by a telecommunications system. In FIG. 9, solid lines may represent user traffic signals, and dashed lines may represent support signaling. MS 1002 is the physical equipment used by the PLMN subscriber. For example, device 120, vehicle 103, network device 300, the like, or any combination thereof may serve as MS 1002. MS 1002 may be one of, but not limited to, a cellular telephone, a cellular telephone in combination with another electronic device or any other wireless mobile communication device.

MS 1002 may communicate wirelessly with BSS 1004. BSS 1004 contains BSC 1006 and a BTS 1008. BSS 1004 may include a single BSC 1006/BTS 1008 pair (base station) or a system of BSC/BTS pairs that are part of a larger network. BSS 1004 is responsible for communicating with MS 1002 and may support one or more cells. BSS 1004 is responsible for handling cellular traffic and signaling between MS 1002 and a core network 1010. Typically, BSS 1004 performs functions that include, but are not limited to, digital conversion of speech channels, allocation of channels to mobile devices, paging, or transmission/reception of cellular signals.

Additionally, MS 1002 may communicate wirelessly with RNS 1012. RNS 1012 contains a Radio Network Controller (RNC) 1014 and one or more Nodes B 1016. RNS 1012 may support one or more cells. RNS 1012 may also include one or more RNC 1014/Node B 1016 pairs or alternatively a single RNC 1014 may manage multiple Nodes B 1016. RNS 1012 is responsible for communicating with MS 1002 in its geographically defined area. RNC 1014 is responsible for controlling Nodes B 1016 that are connected to it and is a control element in a UMTS radio access network. RNC 1014 performs functions such as, but not limited to, load control, packet scheduling, handover control, security functions, or controlling MS 1002 access to core network 1010.

An E-UTRA Network (E-UTRAN) 1018 is a RAN that provides wireless data communications for MS 1002 and UE 1024. E-UTRAN 1018 provides higher data rates than traditional UMTS. It is part of the LTE upgrade for mobile networks, and later releases meet the requirements of the International Mobile Telecommunications (IMT) Advanced and are commonly known as a 4G networks. E-UTRAN 1018 may include of series of logical network components such as E-UTRAN Node B (eNB) 1020 and E-UTRAN Node B (eNB) 1022. E-UTRAN 1018 may contain one or more eNBs. User equipment (UE) 1024 may be any mobile device capable of connecting to E-UTRAN 1018 including, but not limited to, a personal computer, laptop, mobile device, wireless router, or other device capable of wireless connectivity to E-UTRAN 1018. The improved performance of the E-UTRAN 1018 relative to a typical UMTS network allows for increased bandwidth, spectral efficiency, and functionality including, but not limited to, voice, high-speed applications, large data transfer or IPTV, while still allowing for full mobility.

Typically MS 1002 may communicate with any or all of BSS 1004, RNS 1012, or E-UTRAN 1018. In a illustrative system, each of BSS 1004, RNS 1012, and E-UTRAN 1018 may provide MS 1002 with access to core network 1010. Core network 1010 may include of a series of devices that route data and communications between end users. Core network 1010 may provide network service functions to users in the circuit switched (CS) domain or the packet switched (PS) domain. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The circuit-switched MGW function (CS-MGW) 1026 is part of core network 1010, and interacts with VLR/MSC server 1028 and GMSC server 1030 in order to facilitate core network 1010 resource control in the CS domain. Functions of CS-MGW 1026 include, but are not limited to, media conversion, bearer control, payload processing or other mobile network processing such as handover or anchoring. CS-MGW 1026 may receive connections to MS 1002 through BSS 1004 or RNS 1012.

SGSN 1032 stores subscriber data regarding MS 1002 in order to facilitate network functionality. SGSN 1032 may store subscription information such as, but not limited to, the IMSI, temporary identities, or PDP addresses. SGSN 1032 may also store location data such as, but not limited to, GGSN address for each GGSN 1034 where an active PDP exists. GGSN 1034 may implement a location register function to store subscriber data it receives from SGSN 1032 such as subscription or location data.

Serving gateway (S-GW) 1036 is an interface which provides connectivity between E-UTRAN 1018 and core network 1010. Functions of S-GW 1036 include, but are not limited to, packet routing, packet forwarding, transport level packet processing, or user plane mobility anchoring for inter-network mobility. PCRF 1038 uses information gathered from P-GW 1036, as well as other sources, to make applicable policy and charging decisions related to data flows, network resources or other network administration functions. PDN gateway (PDN-GW) 1040 may provide user-to-services connectivity functionality including, but not limited to, GPRS/EPC network anchoring, bearer session anchoring and control, or IP address allocation for PS domain connections.

HSS 1042 is a database for user information and stores subscription data regarding MS 1002 or UE 1024 for handling calls or data sessions. Networks may contain one HSS 1042 or more if additional resources are required. Example data stored by HSS 1042 include, but is not limited to, user identification, numbering or addressing information, security information, or location data. HSS 1042 may also provide call or session establishment procedures in both the PS and CS domains.

VLR/MSC Server 1028 provides user location functionality. When MS 1002 enters a new network location, it begins a registration procedure. A MSC server for that location transfers the location data to the VLR for the area. A VLR and MSC server may be located in the same computing environment, as is shown by VLR/MSC server 1028, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for MS 1002 registration or procedures for handover of MS 1002 to a different section of core network 1010. GMSC server 1030 may serve as a connection to alternate GMSC servers for other MSs in larger networks.

EIR 1044 is a logical element which may store the IMEI for MS 1002. User equipment may be classified as either "white listed" or "black listed" depending on its status in the network. If MS 1002 is stolen and put to use by an unauthorized user, it may be registered as "black listed" in EIR 1044, preventing its use on the network. A MME 1046 is a control node which may track MS 1002 or UE 1024 if the devices are idle. Additional functionality may include the ability of MME 1046 to contact idle MS 1002 or UE 1024 if retransmission of a previous session is required.

While examples of a telecommunications system in which packages can be monitored have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims

The invention claimed is:

1. A system comprising:
   an input/output for communicating with a network;
   a processor communicatively coupled to the input/output;
   a package repository having a radio frequency identification (RFID) reader and a camera communicatively coupled to the processor, wherein the package repository is an enclosable container; and
   memory storing instructions that cause the processor to effectuate operations, the operations comprising:
   detecting, via the RFID reader, an RFID tag associated with a package;
   based on detecting the RFID tag, updating a shipping history of the package with a location of the package repository;
   detecting, by the camera, a presence in a vicinity of the package repository indicative of a person approaching the package repository;
   causing the camera to record image data of at least a portion of the vicinity in response to detecting the presence of the person;
   determining, by the processor, that the person is an authorized user by detecting, via near-field communications, a user device associated with an authorized user of the package repository;
   responsive to the person being an authorized user, providing access to the package repository;
   determining, based on no longer detecting the RFID tag by the RFID reader, that the package has been removed from the package repository; and
   responsive to determining that the package has been removed from the package repository, transmitting at least a portion of the image data captured during a time the package was moved from the package repository.

2. The system of claim 1, the operations further comprising:
   based on the RFID tag, determining that the package repository is a destination of the package, wherein the package repository is a mailbox and is associated with an address; and
   communicating, via the input/output, an alert to a user device associated with the package repository, the alert indicating arrival of the package.

3. The system of claim 2, wherein the package repository further comprises a locking mechanism, and wherein detecting the presence comprising detecting, via a sensor, the user device, the operations further comprising:
   responsive to detecting the user device, unlocking the locking mechanism.

4. The system of claim 1, the package further comprising a package sensor, the operations further comprising:
   receiving, from the package sensor, data indicative of a physical condition of the package; and
   updating the shipping history based on the physical condition.

5. The system of claim 1, the package comprising a package sensor, wherein the package sensor comprises at least one of a temperature sensor, a humidity sensor, an accelerometer, or a force sensor.

6. The system of claim 1, the operations further comprising:
- based on at least one of the RFID tag or an identity of the package repository, identifying a user device associated with the package; and
- alerting the user device that the package is available for pick-up.

7. A method comprising:
- detecting, via a radio frequency identification (RFID) reader of a package repository, an RFID tag associated with a package, wherein the package repository is an enclosable container;
- based on detecting the RFID tag, communicating, to a network device, an update for a shipping history;
- detecting, by a camera associated with the package repository, a presence in a vicinity of the package repository indicative of a person approaching the package repository;
- recording, by the camera in response to detecting the presence of the person, image data of at least a portion of the vicinity;
- determining, by a processor, that the person is an authorized user by detecting, via near-field communications, a user device associated with an authorized user of the package repository;
- responsive to the person being an authorized user, providing access to the package repository;
- determining, based on no longer detecting the RFID tag by the RFID reader, the package has been removed from the package repository; and
- responsive to determining the package has been removed from the package repository, transmitting at least a portion of the image data captured by the camera captured during a time the package was moved from the package repository.

8. The method of claim 7, further comprising:
- receiving, from a package sensor of the package, data indicative of a physical condition of the package,
- wherein the update further includes a condition update based on the physical condition.

9. The method of claim 7, wherein the package repository further comprises a locking mechanism, the method further comprising:
- responsive to detecting the RFID tag, engaging the locking mechanism;
- detecting, via near-field communications, that the presence comprises a user device associated with an authorized user of the package repository; and
- responsive to the presence comprising the user device, unlocking the locking mechanism.

10. The method of claim 7, wherein the shipping history indicates an inventory of the package repository and the update comprises an indication that the inventory comprises the package, the method further comprising:
- responsive to the RFID tag being outside the range of the RFID reader, updating the shipping history to remove the package from the inventory,
- wherein the shipping history is accessible by an authorized user of the package repository.

11. The method of claim 7, wherein the shipping history is associated with the package and the update comprises an indication that the package is located at the package repository, the method further comprising:
- responsive to the RFID tag being outside the range of the RFID reader, updating the shipping history to indicate that the package is not located at the package repository,
- wherein the shipping history is accessible by a shipper of the package, a recipient of the package, or a transporter of the package.

12. The method of claim 7, further comprising:
- based on the RFID tag, determining that the package repository is a destination of the package, wherein the package repository is a mailbox and is associated with an address; and
- communicating an alert to a user device associated with the package repository, the alert indicating arrival of the package.

13. A computer program product comprising:
- a computer-readable storage medium; and
- instructions stored on the computer-readable storage medium that, when executed by a processor, causes the processor to:
  - detect, by a sensor-enabled device via a radio frequency identification (RFID) reader of a package repository, an RFID tag associated with an object at the package repository, wherein the package repository is an enclosable container;
  - update, based on the detection of the RFID tag, a shipping history of the object with a location of the package repository;
  - detect, by the sensor-enabled device, a presence in a vicinity of the package repository indicative of a person approaching the package repository;
  - capture, via a camera associated with the sensor-enabled device in response to detecting the presence of the person, image data indicative of at least a portion of the vicinity;
  - determine, by a processor, that the person is an authorized user by detecting, via near-field communications, a user device associated with an authorized user of the package repository;
  - responsive to the person being an authorized user, provide access to the package repository;
  - determine, by the sensor-enabled device based on no longer detecting the RFID tag by the RFID reader, the object has been removed from the package repository; and
  - responsive to determining the object has been removed from the package repository, transmit at least a portion of the image data captured during a time the object was moved from the package repository.

14. The computer program product of claim 13, wherein the instructions are further configured to cause the processor to:
- responsive to the object being removed, transmit at least a portion of the image data via a wireless network.

15. The computer program product of claim 13, wherein the instructions are further configured to cause the processor to:
- determine that detecting the presence did not include detecting a user device; and
- based on the presence not including the user device transmit at least a portion of the image data.

16. The computer program product of claim 13, wherein the instructions are further configured to cause the processor to:
- detect the object at the package repository, wherein detecting the object comprises sensing an electronic identifier of the object via near-field communication or Bluetooth communication.

17. The computer program product of claim 13, wherein the instructions are further configured to cause the processor to:
  responsive to detecting the RFID tag, engage a locking mechanism of the package repository;
  determine that the presence comprises a user device; and
  responsive to detecting the user device, disengage the locking mechanism.

18. The computer program product of claim 13, wherein the instructions are further configured to cause the processor to transmit an alert, the alert indicating that the object was removed.

19. The system of claim 1, wherein the vicinity is a predefined distance from package repository.

\* \* \* \* \*